United States Patent
Yang

(10) Patent No.: US 9,784,154 B2
(45) Date of Patent: Oct. 10, 2017

(54) VARIABLE VALVE

(71) Applicant: Hyundai Motor Company, Seoul (KR)

(72) Inventor: Young-Dug Yang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/863,272

(22) Filed: Sep. 23, 2015

(65) Prior Publication Data

US 2016/0326924 A1    Nov. 10, 2016

(30) Foreign Application Priority Data

May 6, 2015    (KR) .................. 10-2015-0063137

(51) Int. Cl.
*F01N 1/16*    (2006.01)
*F16K 15/03*    (2006.01)

(52) U.S. Cl.
CPC ............. *F01N 1/163* (2013.01); *F01N 1/165* (2013.01); *F01N 1/166* (2013.01); *F01N 1/168* (2013.01); *F16K 15/033* (2013.01); *F16K 15/035* (2013.01); *F01N 2260/14* (2013.01); *F01N 2390/08* (2013.01)

(58) Field of Classification Search
CPC ............. F01N 1/163; F01N 1/165; F16K 1/20
USPC ......... 251/298, 303; 137/315.16, 527, 512.4, 137/512
See application file for complete search history.

(56) References Cited

U.S. PATENT DOCUMENTS

| 4,005,732 A | * | 2/1977 | Buckner | ............... F16K 15/038 137/512.1 |
| 4,249,567 A | * | 2/1981 | Weiss | .................... F16K 15/038 137/512 |
| 4,942,898 A | * | 7/1990 | Osowski | ................. E01F 5/005 137/454.2 |

FOREIGN PATENT DOCUMENTS

| JP | 5-202729 A | 8/1993 |
| JP | 10-266837 A | 10/1998 |
| JP | 2005-325820 A | 11/2005 |
| KR | 10-2011-0062123 A | 6/2001 |
| KR | 10-1114394 B1 | 3/2012 |
| KR | 10-2012-0110642 A | 10/2012 |

* cited by examiner

*Primary Examiner* — Mary McManmon
*Assistant Examiner* — Nicole Gardner
(74) *Attorney, Agent, or Firm* — Morgan, Lewis & Bockius LLP

(57) ABSTRACT

A variable valve may include a housing having hinge support portions protruding from a first side thereof, and an opening at a second side thereof, a first gate rotatably coupled to the hinge support portions so as to open and close a part of the opening, a first spring mounted on the housing to apply elastic force in a direction in which the first gate is closed, a second gate rotatably coupled to the hinge support portions so as to open and close a remaining part of the opening, and a second spring mounted on the housing to apply elastic force in a direction in which the second gate is closed, in which the first spring and the second spring may have different spring constants.

6 Claims, 4 Drawing Sheets

VARIABLE VALVE

CROSS-REFERENCE TO RELATED APPLICATION

The present application claims priority to Korean Patent Application No. 10-2015-0063137, filed May 6, 2015, the entire contents of which is incorporated herein for all purposes by this reference.

BACKGROUND OF THE INVENTION

Field of the Invention

The present invention relates to a variable valve that is adjusted to be opened and closed by flow pressure of exhaust gas, and more particularly, to a variable valve in which two gates open and close an opening, and springs connected with the gates are set to have different spring properties to allow the variable valve to be partially opened.

Description of Related Art

An exhaust system, which discharges exhaust gas produced in an engine to a rear side of a vehicle body, includes a muffler that reduces exhaust noise when exhaust gas is discharged.

The muffler mounted in a vehicle is formed in a cylindrical shape having a predetermined shape, and a plurality of pipes and baffles are mounted in the muffler so as to reduce exhaust noise by inducing expansion of exhaust gas, resonance, and absorbing noise when exhaust gas flows.

Meanwhile, because the amount of exhaust gas produced in the engine varies with traveling situations of the vehicle, a variable valve is mounted in the muffler in order to more efficiently adjust exhaust efficiency and performance in inhibiting noise in accordance with the traveling situations.

The variable valve serves to reduce exhaust noise by closing a gate when the engine is rotated at a low speed, and to improve exhaust performance by opening the gate when the engine is rotated at a high speed.

Typically, the variable valve is mounted to any one of the pipe mounted in the muffler and the baffle that forms a wall surface so as to divide an internal space of the muffler, and has a structure as illustrated in FIG. 1. That is, the variable valve in the related art is configured so that a gate 2 is rotatably coupled to a housing 1 so as to open and close an opening in the housing 1.

The gate 2 is mounted to be rotatable about a shaft 3a which is mounted on hinge support portions 1a formed at one side of the housing 1 and serves as a rotation axis, and a coil-shaped torsion spring 3, which has one end in contact with the gate 2 and elastically presses the gate, is coupled to the shaft 3a.

The variable valve in the related art, which is configured as described above, is operated so that the gate 2 is opened when pressure of exhaust gas exceeds elastic force of the torsion spring 3, and the gate 2 is maintained in a closed state when pressure of exhaust gas is lower than elastic force of the torsion spring 3.

That is, the variable valve is closed in a low speed section to attenuate low-frequency noise, and gradually opened in middle and high speed sections to attenuate high-frequency noise and has no effect on output of the engine by reducing resistance of exhaust gas.

However, when the variable valve in the related art is used under an environment having a predetermined high temperature, spring properties of the torsion spring 3 significantly deteriorate and thus it is impossible to precisely control a flow rate, and as a result, there is a problem in that when the gate 2 is opened up to a designed value or larger, interference with peripheral components occurs.

In the case of the variable valve in the related art, one end of the torsion spring 3 is just in point contact with the gate 2 to support the gate 2, and as a result, there are problems in that abnormal noise occurs due to rattling of the gate 2 because the torsion spring 3 does not durably support the motion of the gate 2, and abnormal touching noise occurs due to a collision between the gate 2 and the housing 1 when the gate 2 is closed.

In the case of the variable valve having a structure in the related art, an opening degree of the gate 2 is determined by a spring constant of the torsion spring 3, but there is a situation in which under an actual vehicle condition, problems of exhaust booming need to be solved by dividing the time when the exhaust booming occurs into when the vehicle is idling and when the vehicle travels.

That is, in a situation in which flow conditions of exhaust gas vary, it is difficult to cope with noise, vibration and harshness (NVH) performance of the vehicle and efficiently control an opening degree of the gate 2 by using only the single torsion spring 3 like the structure in the related art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a variable valve, in which a flat spring is used to inhibit the occurrence of abnormal noise and more precisely control a flow rate, and two gates are independently opened and closed in order to more efficiently control a flow rate of exhaust gas in accordance with traveling situations of the vehicle under an actual vehicle condition.

According to various aspects of the present invention, a variable valve may include a housing having hinge support portions protruding from a first side thereof, and an opening at a second side thereof, a first gate rotatably coupled to the hinge support portions so as to open and close a part of the opening, a first spring mounted on the housing to apply elastic force in a direction in which the first gate is closed, a second gate rotatably coupled to the hinge support portions so as to open and close a remaining part of the opening, and a second spring mounted on the housing to apply elastic force in a direction in which the second gate is closed, in which the first spring and the second spring may have different spring constants.

The first spring and the second spring may be flat springs that are supported by a spring support portion coupled to upper ends of the hinge support portions and may have ends configured to press the first gate and the second gate, respectively.

The first gate and the second gate may each have a semi-circular shape so that a circular plate shape is formed when both of the first gate and the second gate are closed, and a center of the circular plate shape may be placed on the first gate so that the first gate has a larger area than the second gate.

The first spring and the second spring may each be a flat spring bent in a 'C' shape, and having a bent portion that is additionally bent at an upper end of the flat spring so as to prevent excessive elastic deformation.

The first spring may be a spring that has a greater spring constant than the second spring.

According to the present invention having the aforementioned configurations, the first gate and the second gate independently control a flow rate of exhaust gas in accordance with the situations, that is, when the vehicle is idling and a relatively small amount of exhaust gas is produced and when the vehicle travels and a relatively large amount of exhaust gas is produced, thereby maximizing NVH performance and power performance of the vehicle.

The first gate and the second gate are coupled to flat springs having a 'C' shape, thereby improving durability in comparison with the coil-shaped torsion spring in the related art. The bent portion is formed at the end of the flat spring, thereby preventing the flat spring from being excessively deformed elastically and restricting opening degrees of the first gate and the second gate.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the inventions) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
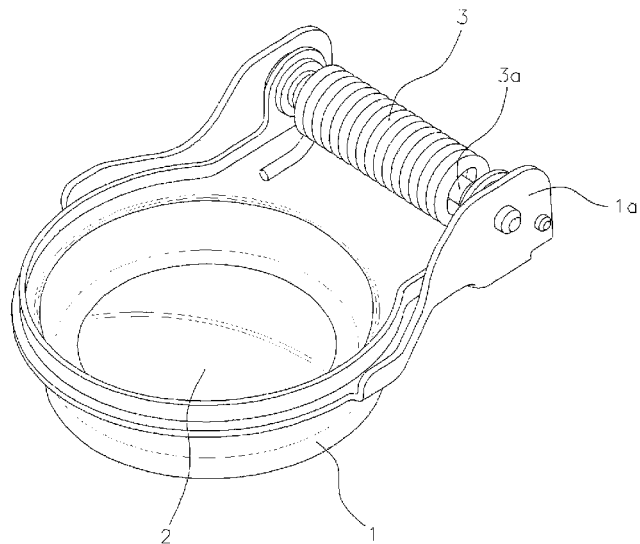
FIG. 1 is a view illustrating a variable valve in the related art.
Figure 2:
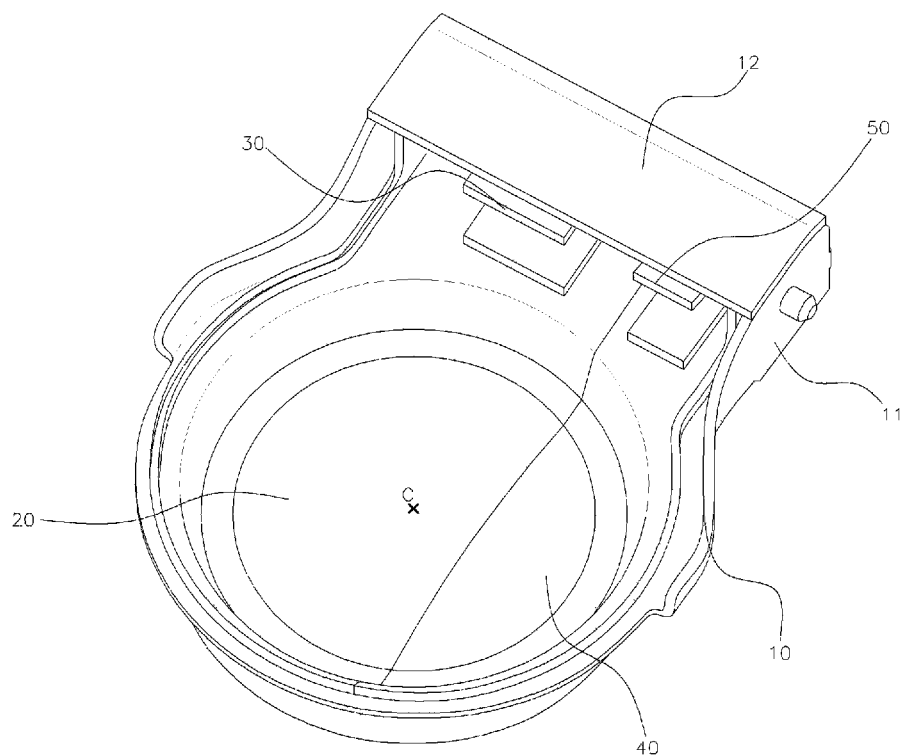
FIG. 2 is a perspective view of an exemplary variable valve according to the present invention.
Figure 3:
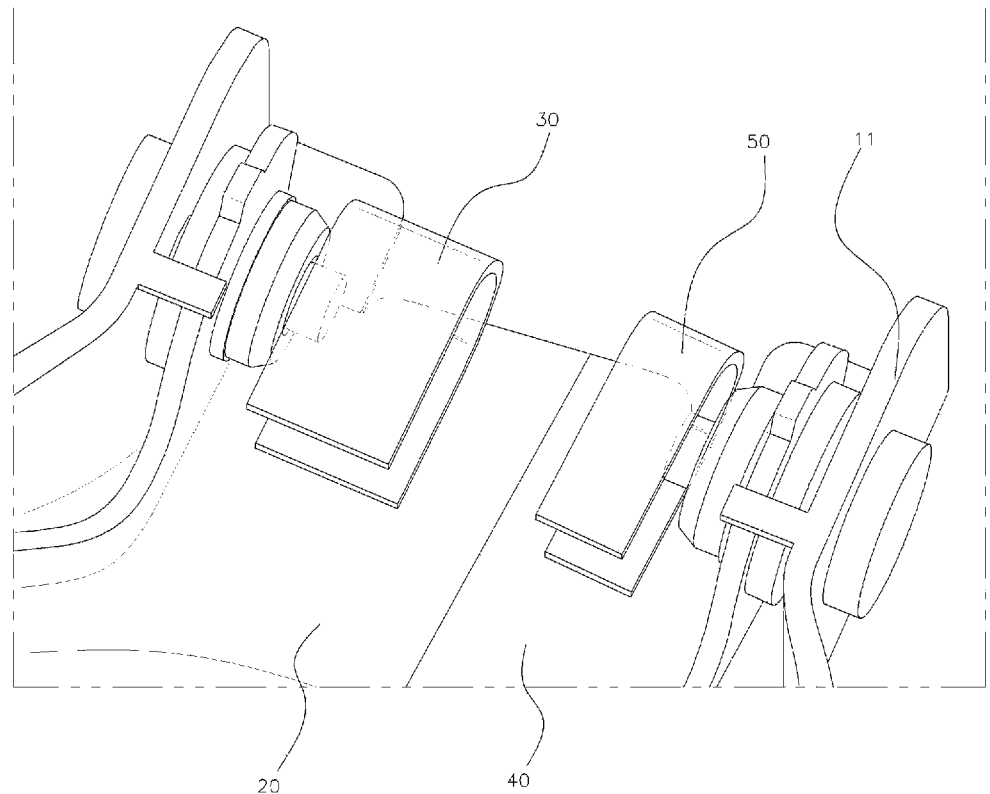
FIG. 3 is a view illustrating a state in which a spring support portion is detached from the exemplary variable valve according to the present invention.

Referring to FIG. 2 and FIG. 3, a variable valve according to the present invention has a structure in which a first gate 20 and a second gate 40 are independently rotatably coupled to a housing 10.

Hinge support portions 11 protrude from one side of the housing 10, and an opening (see FIG. 6 and FIG. 7) through which exhaust gas flows in and out is formed at the other side of the housing 10. The first gate 20 and the second gate 40 are rotatably mounted on the hinge support portions 11, respectively, and mounted at positions at which the first gate 20 may cover a part of the opening, and the second gate 40 may cover the remaining part of the opening.

A first spring 30, which is disposed to apply elastic force in a direction in which the first gate 20 is closed, and a second spring 50, which is disposed to apply elastic force in a direction in which the second gate 40 is closed, are mounted on the housing 10.

Figure 4A:
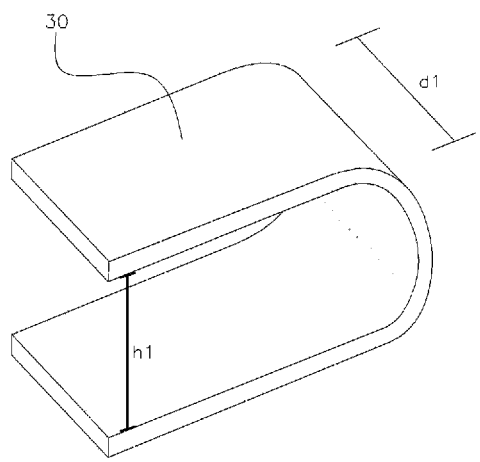
FIG. 4A and FIG. 4B are views illustrating a first spring and a second spring according to the present invention.
Figure 4B:
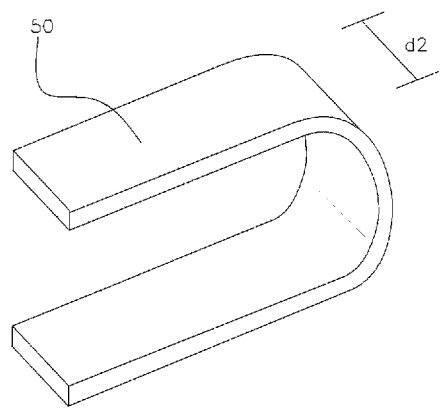

As illustrated in FIG. 3, FIG. 4A and FIG. 4B, the first spring 30 and the second spring 50 according to the present invention are configured so that upper ends of the first spring 30 and the second spring 50 are supported by a spring support portion 12 coupled to the hinge support portions 11, respectively, and lower ends of the first spring 30 and the second spring 50 press the first gate 20 and the second gate 40, respectively (in a state in which the upper ends are fixedly supported by the spring support portion), and the first spring 30 and the second spring 50 are manufactured as flat springs.

In more detail, the first spring 30 and the second spring 50 are flat springs that are bent in a 'C' or 'U' shape, and the first spring 30 and the second spring 50 are manufactured to have different widths (d1 and d2) or different thicknesses or materials so as to have different spring constants.

Figure 5A:
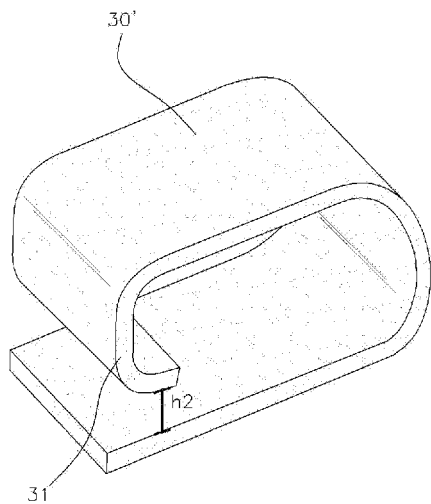
FIG. 5A and FIG. 5B are views illustrating a first spring and a second spring according to the present invention.
Figure 5B:
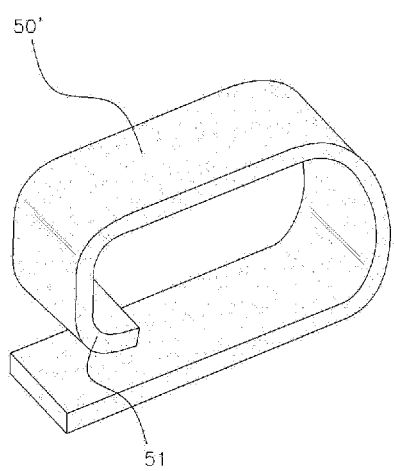

According to various embodiments of the present invention, as illustrated in FIG. 5A and FIG. 5B, a first spring 30' and a second spring 50' may have bent portions 31 and 51 that are additionally bent downward from the upper end in order to prevent the first gate 20 and the second gate 40 from being excessively opened and to improve durability thereof. Because of the bent portions 31 and 51, a range in which the first spring 30' and the second spring 50' may be elastically deformed is narrowed from h1 to h2, thereby providing a structure that additionally restricts opening degrees of the gates 20 and 40.

Therefore, the first spring 30 and the second spring 50 are manufactured to have different spring constants, such that points of time at which the first gate 20 and the second gate 40 are opened are set to vary in accordance with a flow rate of exhaust gas.

Meanwhile, in various embodiments of the present invention, the first gate 20 and the second gate 40 have a semi-circular shape so that a circular plate shape is formed when both of the first gate 20 and the second gate 40 are closed, and the first gate 20 and the second gate 40 are formed so that the first gate 20 has a larger area than the second gate 40, and a center (indicated by 'C' in FIG. 2) of the circle (formed by the first gate 20 and the second gate 40)

is placed on the first gate 20. Further, the first spring 30 is configured as a spring that has a greater spring constant than the second spring 50.

Figure 6:
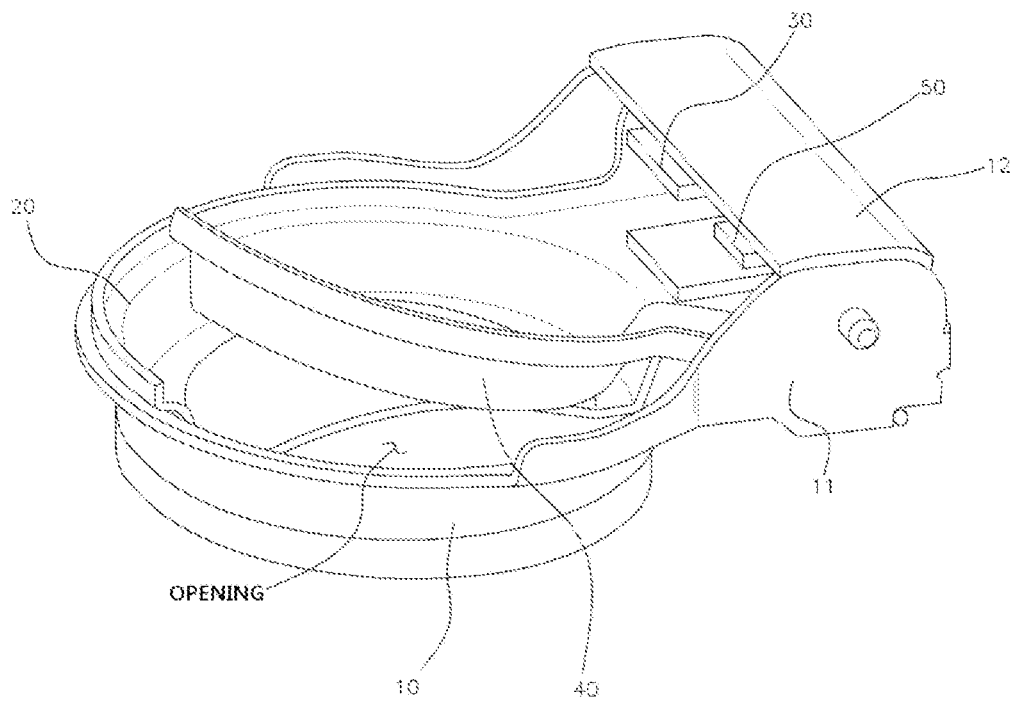
FIG. 6 is a view illustrating a state in which only a second gate is opened because of a relatively low flow rate of exhaust gas according to the present invention.
Figure 7:
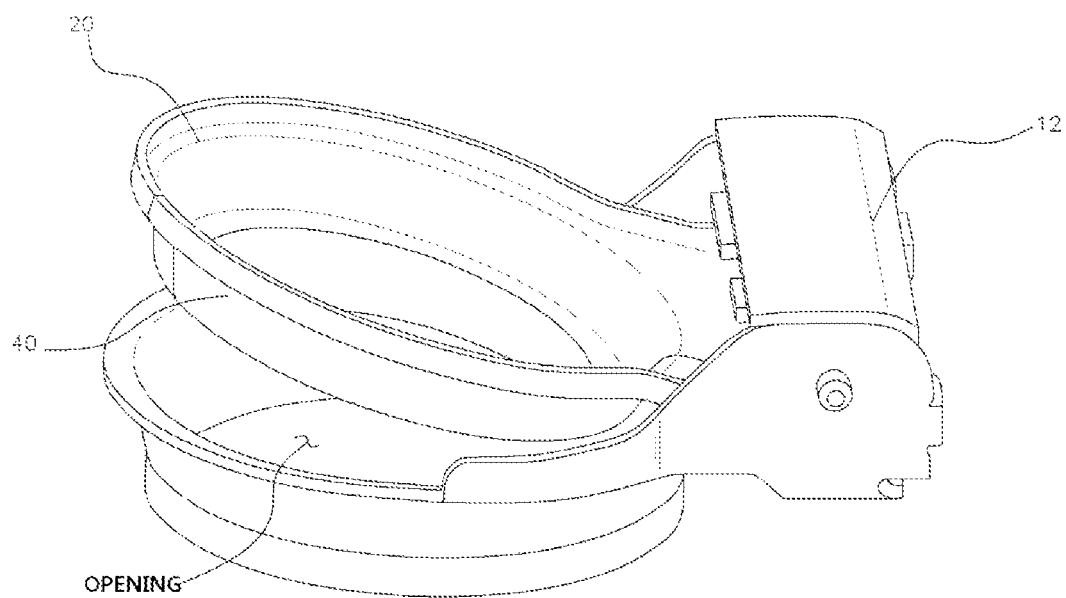
FIG. 7 is a view illustrating a state in which both of a first gate and a second gate are opened because of a relatively high flow rate of exhaust gas according to the present invention.

Therefore, when a small amount of exhaust gas is discharged, only the second gate 40 is opened first as illustrated in FIG. 6, and in a state in which a flow rate of exhaust gas is additionally increased as a vehicle travels, the first gate 20 is also opened as illustrated in FIG. 7.

In more detail, (because only the second spring having a smaller spring constant is elastically deformed) when the vehicle is idling and a small amount of exhaust gas is discharged, only the second gate 40 having a smaller area is opened to minimize a flow rate of exhaust gas and reduce exhaust booming. Further, (because the first spring having a larger spring constant is also elastically deformed) when the vehicle accelerates or travels and a large amount of exhaust gas is discharged, the first gate 20 is also opened by a flow rate of exhaust gas that is more increased than when the vehicle is idling, and as a result, the variable valve performs a similar operation to the variable valve in the related art. Therefore, the variable valve according to the present invention may appropriately ensure both traveling booming performance and power performance.

Therefore, the structure according to the present invention independently controls a flow rate of exhaust gas in accordance with the situations in which the vehicle is idling and travels, thereby maximizing noise, vibration and harshness (NVH) performance and power performance of the vehicle.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable valve comprising:
   a housing having hinge support portions protruding from a first side thereof, and an opening at a second side thereof;
   a first gate rotatably coupled to the hinge support portions so as to open and close a part of the opening;
   a first spring mounted on the housing to apply elastic force in a direction in which the first gate is closed;
   a second gate rotatably coupled to the hinge support portions so as to open and close a remaining part of the opening; and
   a second spring mounted on the housing to apply elastic force in a direction in which the second gate is closed,
   wherein the first spring and the second spring have different spring constants, and
   wherein the first spring and the second spring comprise flat springs that are supported by a spring support portion fixedly coupled to upper ends of the hinge support portions and have ends configured to press the first gate and the second gate, respectively.

2. The variable valve of claim 1, wherein the first gate and the second gate each have a semi-circular shape so that a circular plate shape is formed when both of the first gate and the second gate are closed, and a center of the circular plate shape is placed on the first gate so that the first gate has a larger area than the second gate.

3. The variable valve of claim 1, wherein the first spring and the second spring each comprise a flat spring bent in a 'C' shape, and having a bent portion that is additionally bent at an upper end of the flat spring so as to prevent excessive elastic deformation of the flat spring.

4. The variable valve of claim 3, wherein the first gate and the second gate each have a semi-circular shape so that a circular plate shape is formed when both of the first gate and the second gate are closed, and a center of the circular plate shape is placed on the first gate so that the first gate has a larger area than the second gate.

5. The variable valve of claim 4, wherein the first spring is a spring that has a greater spring constant than the second spring.

6. The variable valve of claim 1, wherein the first gate and the second gate each have a semi-circular shape so that a circular plate shape is formed when both of the first gate and the second gate are closed, and a center of the circular plate shape is placed on the first gate so that the first gate has a larger area than the second gate.

* * * * *